United States Patent [19]

Greutert

[11] Patent Number: 4,619,048
[45] Date of Patent: Oct. 28, 1986

[54] METHOD FOR FORMING COMPOSITE PART COMPRISING A PLASTIC FRAME AND A PERFORATED METAL FOIL

[76] Inventor: Albert Greutert, Sonnhalde, 6072 Sachseln, Switzerland

[21] Appl. No.: 603,548

[22] Filed: Apr. 25, 1984

[30] Foreign Application Priority Data

May 2, 1983 [DE] Fed. Rep. of Germany ....... 3315887

[51] Int. Cl.⁴ .............................................. B26B 19/04
[52] U.S. Cl. ................................ 30/346.51; 30/43.91; 30/43.92
[58] Field of Search ............... 30/346.51, 43.92, 43.91, 30/DIG. 2; 29/402.18, 18

[56] References Cited

U.S. PATENT DOCUMENTS

| | | | |
|---|---|---|---|
| 3,765,086 | 10/1973 | Zuurveen | 30/346.51 |
| 3,774,306 | 11/1973 | Konig | 30/346.51 |
| 4,035,914 | 7/1977 | Blume | 30/341.51 |
| 4,133,103 | 1/1979 | Beck | 30/346.51 |

Primary Examiner—Douglas D. Watts
Assistant Examiner—Willmon Fridie, Jr.
Attorney, Agent, or Firm—Townsend and Townsend

[57] ABSTRACT

A shaving head for dry razors in which a perforated shaving foil is connected to a plastic frame is produced by placing the shaving foil in an injection mould and holding it in thermal contact with the wall of the injection mould on one side while the plastic frame is injection-moulded in order to limit the rise in the temperature of the shaving foil during the injection-moulding process.

3 Claims, 11 Drawing Figures

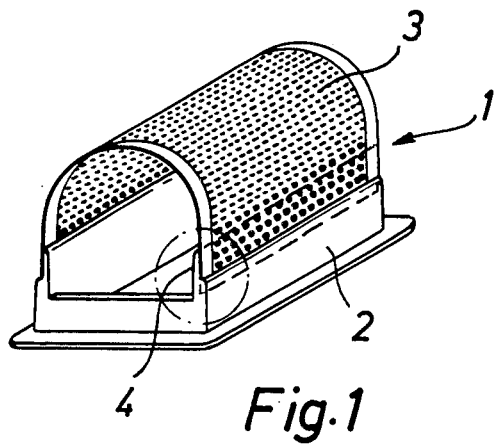
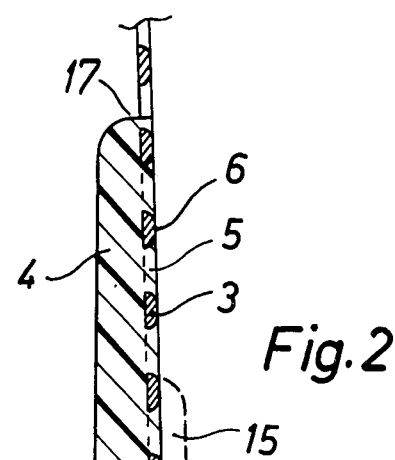
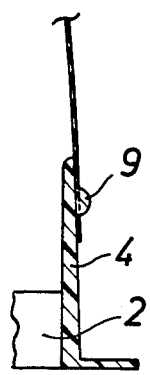
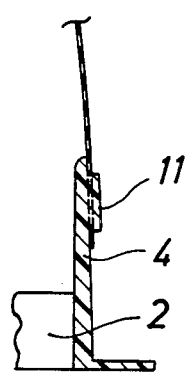
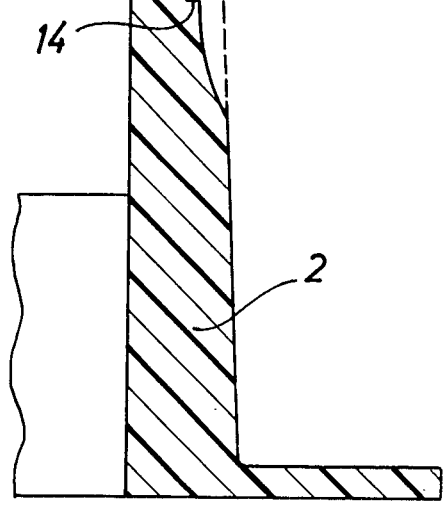
Fig.1
Fig.2
Fig.3
Fig.4
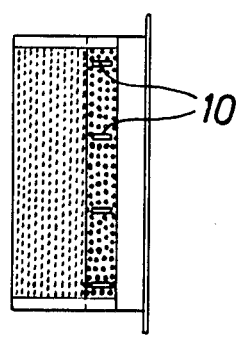
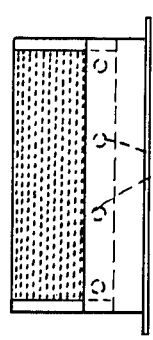
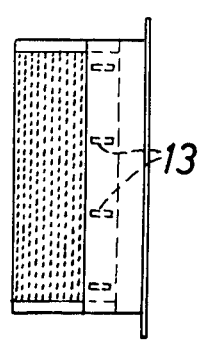
Fig.5
Fig.6
Fig.7
Fig.8

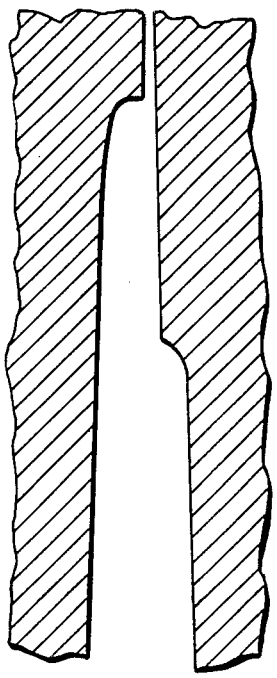
FIG._9.
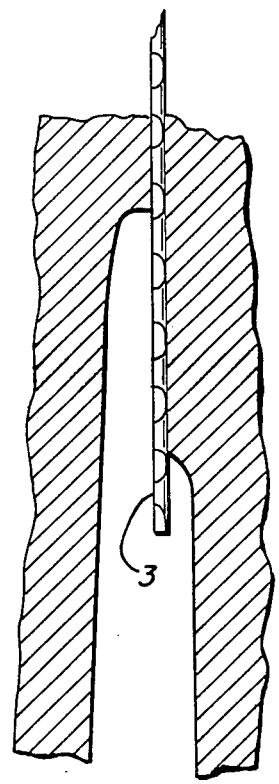
FIG._10.
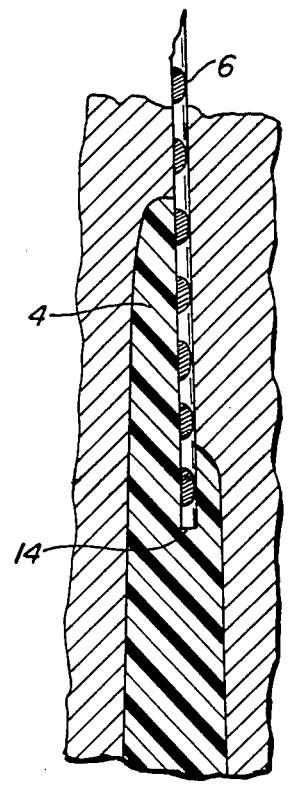
FIG._11.

METHOD FOR FORMING COMPOSITE PART COMPRISING A PLASTIC FRAME AND A PERFORATED METAL FOIL

BACKGROUND OF THE INVENTION

The invention relates to a composite part comprising a plastic frame and at least one, at least partially perforated metal foil, used especially as a shaving head for dry razors, and a method of manufacturing the same.

Shaving heads for dry razors, in which the shaving foil is embedded with its longitudinal edge regions in a plastic frame, are already known. However, it has been found that the metal having foil tends to break or crack in the region between the plastic frame and the shaving foil when substantial bending forces are exerted on the shaving foil.

BRIEF SUMMARY OF THE INVENTION

It is an object of the invention to provide a composite part of the aforementioned kind in which the tendency to break or crack of the metal foil is reduced.

This object is achieved by the feature that at least an area of one planar surface of the metal foil remains exposed while the other surface is molded to the affixing area of the frame.

It has been found that the tendency to break or crack of the metal foil is due to embrittlement of the metal when it is embedded in the plastic frame during injection-moulding due to exposure to high temperatures of as much as 320° C. during manufacture.

Since in applicant's invention the metal foil is exposed along one surface at least in a transition region adjoining the affixing area, the exposed part of the metal foil may be cooled during manufacture by thermal contact of the metal foil with the wall of the mould, and as a result the temperature of the metal foil does not exceed 180° C.

In a shaving head having a perforated metal foil made by electrodisposition, the perforations flare towards the outer surface of the metal foil, which comes into contact with the skin of a user. In such a shaving head it is advantageous to position the perforated shaving foil such that it lies against the outer peripheral region of the frame. Thus, plastic may penetrate through the perforations during injection-moulding, and since these perforations flare towards the outside, the perforated shaving foil is securely anchored on the plastic frame.

Alternatively, the shaving foil can butt against the inside of the frame. Although the perforations thus do not flare but taper when seen from the surface of the metal foil which is in contact with the plastic frame, this may be tolerated due to the fact that the shaving foil is exerting a pressure towards the plastic frame, and not away from it, as in the afore-mentioned shaving head.

In both embodiments, the transition region of the shaving foil may be provided with holes which are larger than the perforations in the shaving area. In accordance with another embodiment, headlike protrusions are formed in the area of the holes on the surface of the shaving foil remote from the plastic frame. By this, a rigid and durable junction between the shaving foil and the plastic frame is provided.

Preferably, the holes form longitudinal slots, and the plastic protrusions are elongated and slightly flaring. By this, the finishing composite part may be removed from the mould without the need of an extractor.

A still more solid anchorage of the shaving foil in the plastic frame is obtained if the edges of the shaving foil are embedded in the plastic frame at least partly in the region of the affixing area.

The method of manufacturing a composite part comprises the steps that the metal foil is placed in a mould which leaves a cavity free which corresponds to the shape of the plastic frame. The mould is so formed and the metal foil is placed in the mould prior to injection-moulding of the plastic frame such that one of the surfaces of the metal foil is in contact with the wall of the mould at least along the transition region adjacent the affixing area of the metal foil in the cavity of the mould.

In an alternate method, a mould is used, the inner wall of which is provided with recesses at locations in the region of and in alignment with the holes of the metal foil, which is positioned in the mould prior to injection-moulding, in those areas of the metal foil, which are in contact with the wall of the mould.

BRIEF DESCRIPTION OF THE DRAWINGS

The invention is described with reference to schematic drawings in several embodiments, in which:

FIG. 1 is a perspective view of a shaving head for dry razors;

FIG. 2 is an end view, shown partially in section, of the area of the shaving head shown in FIG. 1;

FIGS. 3 and 4 are end views of the area shown in FIG. 2 of modified embodiments in which headlike protrusions are provided;

FIG. 5 is a plan view of the longitudinal side of the shaving head shown in FIG. 3;

FIG. 6 is a plan view of the longitudinal side of the shaving head shown in FIG. 4;

FIG. 7 is an alternative embodiment of the shaving head shown in FIG. 5, and

FIG. 8 is an alternative embodiment of the shaving head shown in FIG. 6.

FIGS. 9-11 illustrate the series of steps in the manufacture of the composite part, including the empty mold for the composite part, the foil placed in the mold, and the mold injected with plastic.

DETAILED DESCRIPTION OF PREFERRED EMBODIMENTS

The shaving head 1 illustrated in FIG. 1 comprises a rectangular plastic frame 2 and a perforated shaving foil 3 which is fixed along its longitudinal edges to the longitudinally aligned areas of the plastic frame 2.

It may be seen from FIG. 1 that the longitudinally aligned areas of the plastic frame exhibit an upward tapering area 4 which constitutes the area fixing the shaving foil to the frame.

FIG. 2 is a partial sectional view of the area encircled in FIG. 1. The perforated shaving foil 3 is provided with perforations 5 which flare towards the outside of the shaving foil, and is exposed at its outer surface 6, even in the transition region adjacent the affixing area 15, i.e. the shaving foil is not embedded in plastic in this area. By this, the shaving foil may be cooled during manufacture of the composite part by an injection-moulding process, so that its temperature does not rise beyond a certain level. This is particularly important when a hard material, i.e. hard nickel, is used for making the shaving foil, which tends to become brittle when excessively heated.

FIGS. 3 and 5 show another embodiment in which the shaving foil is not only connected to the plastic frame by means of the perforations and the plastic material penetrating the same, but in which additional attachment orifices 8 are provided in the transition region 7 of the shaving foil, which is shown in hatched lines in FIG. 5, said attachment orifices having a greater diameter than the perforations. Attachment protrusions 9 are formed from the plastic passing through the holes.

FIGS. 4 and 6 show a modified embodiment, in which the attachment orifices 10 and the headlike attachment protrusions 11 are elongated. Such elongated protrusions facilitate extraction of the shaving head from the mould at the end of the production process.

In accordance with another embodiment illustrated in FIG. 7, the shaving foil is merely provided in the transition region with holes 12 instead of perforations, at which headlike protrusions are formed as in the embodiment shown in FIGS. 3 and 5.

FIG. 8 shows an embodiment corresponding to the one shown in FIG. 7, but having longitudinal slots 13.

To manufacture the shaving head illustrated in FIGS. 1 and 2, the shaving foil 3 is placed in a mould which leaves a cavity which corresponds to the shape of the plastic frame 2. In addition, a certain semi-cylindrical gap is provided into which the shaving foil 3 may be inserted so that its entire outwardly facing surface butts against the wall of the mould. When the plastic frame is injection-moulded, plastic not only penetrates into the mould cavity, but also through the perforations 5 in the shaving foil in the fixing area so that these perforations are filled with plastic.

When using shaving foils provided with attachment orifices in the transition region, recesses may be provided in the wall of the mould at locations in alignment with the holes, into which plastic passes during injection-moulding and forms headlike attachment protrusions.

As shown by the broken line in FIG. 2, the edge 14 lying in the affixing area is fully embedded in plastic over an area 15 which however does not extend to the transition region 7 of the shaving foil into the affixing area, so that the shaving foil is anchored more solidly in the plastic frame 2. The embrittlement of the shaving foil in the area where it is totally embedded in plastic is not detrimental since the shaving foil is not exposed to any bending forces in this region.

The method in accordance with the invention provides a solid thermal connection between a plastic frame and a metal foil. The metal foil is heated during the injection-moulding process to a temperature which is significantly lower than the temperature of the injection-moulding compound. Thus, embrittlement of the metal occurring with many hard or hardened materials under excessive temperature is avoided.

FIGS. 5 through 11 are a fragmentary sequence of drawings illustrating the method of making the composite part. FIG. 9 illustrates the portion of the empty mold which contains the transition region of the affixing area of the frame. FIG. 10 shows the metal foil 3 placed within the mold prior to the injection step. In FIG. 11, the plastic has been injected to form the composite part. These Figures are fragmentary since it would be known to one skilled in the art how to provide a mold for the other conventional portions of the composite part. The foil must have at least one surface in the affixing area abutting the mold surface to prevent embrittlement of the metal.

I claim:

1. An improved method for manufacturing and injection molding an improved composite part for use as a shaving head in dry razors, comprising the steps of:

providing a generally planar partially perforated metal foil, bent to provide a shaving head;

providing a mold with a recess suitable for injection molding of the composite part consisting of the foil and a frame having an affixing area along which at least one edge of the foil will be embedded in the frame and a transition region adjacent the affixing area in which one surface of the foil will abut the frame and the other surface thermally abut the mold;

providing the foil with at least one attachment orifice disposed in the transition region and providing the mold with a corresponding recess for forming at least one attachment protrusion for mating engagement with the at least one attachment orifice;

inserting the foil within the mold; and injecting the flowable plastic into the mold.

2. An improved method for manufacturing and injection molding an improved composite part for use as a shaving head in dry razors, comprising the steps of:

providing a planar partially perforated metal foil;

providing a mold with a recess suitable for injection molding of the composite part consisting of the foil and a rectangular frame having an affixing area along which two edges of the foil will be embedded in the frame and an adjacent transition region along which one surface of the foil will abut the frame and the other surface thermally abuts the mold;

inserting the foil within the mold; and injecting the flowable plastic into the mold.

3. The method of claim 2, wherein the foil is provided with at least one attachment orifice disposed along the transition region, and the mold is provided with a recess for forming at least one attachment protrusion for mating engagement with the at least one attachment orifice.

* * * * *